United States Patent [19]

Cory

[11] 4,305,250

[45] Dec. 15, 1981

[54] SOLID STATE HEAT ENGINE

[76] Inventor: John S. Cory, 1436 View Point Ave., Escondido, Calif. 92025

[21] Appl. No.: 195,770

[22] Filed: Oct. 10, 1980

Related U.S. Application Data

[63] Continuation of Ser. No. 918,836, Jun. 26, 1978, abandoned.

[51] Int. Cl.³ .............................................. F03G 7/06
[52] U.S. Cl. ...................................................... 60/527
[58] Field of Search .................................. 60/527, 529

[56] References Cited

U.S. PATENT DOCUMENTS

| | | | |
|---|---|---|---|
| 3,303,642 | 2/1967 | Lee | 60/527 X |
| 3,913,326 | 10/1975 | Banks | 60/527 |
| 4,030,298 | 6/1977 | Sandoval | 60/527 |
| 4,037,411 | 7/1977 | Hochstein | 60/527 |
| 4,055,955 | 11/1977 | Johnson | 60/527 |
| 4,075,846 | 2/1978 | Li | 60/527 |

*Primary Examiner*—Allen M. Ostrager

*Attorney, Agent, or Firm*—Robert J. Mawhinney

[57] ABSTRACT

A compact solid state turbine heat engine can be devised by pairing the Nitinol elements. Each element is characterized by being in thermal contact with at least one hot water and one cold water bath and mechanically coupled to at least one driven pulley and driver pulley. A second Nitinol element is similarly configured with a driver pulley, driven pulley, hot and cold water bath. The driver pulley associated with the first nitinol element is mechanically coupled to the driven pulley of the second Nitinol element. Similarly, the driver pulley of the second Nitinol element is mechanically coupled to the driven pulley of the first Nitinol element. The paired Nitinol elements form a compound solid state turbine engine wherein each Nitinol element lies in a single plane and wherein the engine may be combined with a plurality of such pairs for increased power output. The Nitinol elements may also incorporate a snubber to limit the strain on the element and the engine may further incorporate a variable radius pulley to increase the efficiency of mechanical conversion.

32 Claims, 9 Drawing Figures

SOLID STATE HEAT ENGINE

This is a continuation of application Ser. No. 918,836, filed June 26, 1978, now abandoned.

BACKGROUND OF THE INVENTION

1. Field of the Invention

The present invention relates to the field of thermodynamic heat engines and more particularly to heat engines incorporating a solid state element as the working medium.

2. Description of the Prior Art

Conventional thermodynamic heat engines employ a gas or gas-liquid thermodynamic working medium to drive the engine. By exploiting the solid state joule effect it has also been found possible to devise a thermodynamic heat engine which employs a solid state material as the working medium. The joule effect is based upon a change in physical size of a solid state element with a change in temperature.

There are two principal types of solid state, joule effect, solid state heat engines which have previously been employed. The first type is a turbine type, as shown in Lee, U.S. Pat. No. 3,303,642, wherein the phases of energy addition and removal in the thermodynamic cycle are performed by means of a torque applied to and exerted by a pair of pulleys. The second type is a field type of solid state engine, as shown in Cory, U.S. Pat. No. 4,027,479, wherein the phases of energy addition and removal of the thermodynamic cycle is exchanged in a reaction against a force field. Other types of conventional solid state thermodynamic engines include hydraulic, off-set crank and swash-plate engines which are characterized by the mechanical element which adds or extracts work from the solid state medium.

However, the reliability, efficiency, cost and output performance of each of these prior art solid state engines has been limited and generally restricted from having any practical or commercial applicability. What is needed is an improved solid state engine which overcomes each of these shortcomings of the prior art and by which the efficiency, reliability, and output performance of a solid state engine may be increased to practical levels.

BRIEF SUMMARY OF THE INVENTION

The present invention includes a compound solid state heat engine which comprises a source of thermal energy, a sink for thermal energy, a first and second solid state heat engine and a means for coupling. Each solid state heat engine has a corresponding energy-transferring medium, a driven means and a driver means. The corresponding driven and driver means for each heat engine is mechanically coupled with the corresponding energy transferring medium. The corresponding driven and driver means translates force exerted by the corresponding energy transferring medium into a force exerted by the respective driven and driver means. The corresponding energy transferring medium is thermally coupled to the source and sink. The coupling means couples the driven means of the first solid state heat engine to the driver means of the second solid state heat engine. In addition, the coupling means couples the driven means of the second solid state heat engine to the driver means of the first solid state heat engine. By this combination the first and second solid state heat engines are cooperatively paired to provide an increased power output, and to provide an operative compound engine.

The present invention is further characterized by having each corresponding energy transferring means lying in a substantially planar surface whereby the first and second solid state heat engines form a compact pair.

In another embodiment of the present invention at least one of the corresponding energy transferring means associated with the first or second solid state heat engines includes a snubbing means for limiting tensile stress or strain applied to the energy transferring means.

In another embodiment of the present invention at least one of the driven or driver means includes a variable radius pulley. The variable radius pulley is characterized by having a temporally varying radius in each angular direction with respect to a frame of reference rotating at the same angular velocity as the variable radius pulley and is further characterized by having a temporally constant radius in each angular direction with respect to a fixed non-rotating frame of reference. The constant radius differs in magnitude in each angular direction with respect to the fixed, non-rotating frame of reference.

In yet another embodiment of the present invention, the invention is a compound solid state heat engine comprising a plurality of heat sources and sinks arranged in a first and second symmetric half. The heat source in the first half is juxtaposed next to a heat source in the second half. Similarly, a heat sink in the first half is juxtaposed to a heat source in the second half. The heat sources and sinks are alternately disposed within each of the first and second halves. The engine also includes a plurality of idler rollers, one of such plurality being disposed in each of the plurality of heat sources and sinks. A further plurality of driven rollers and driver rollers are included. Each driven roller of the plurality of rollers associated with one of the first and second halves is coupled to a driver roller of the plurality of rollers which is associated with the other one of the first and second half. A first and second plurality of thermally responsive solid state members are coupled to the plurality of idler, driven, and driver rollers. The first plurality of solid state members is coupled to those rollers associated with the first half and the second plurality of solid state members is coupled to those rollers associated with a second half. The first and second plurality of solid state members are urged by the plurality of idler rollers in thermal contact with the plurality of heat sources and sinks. By this combination of elements a compact solid state heat engine is devised having an increased power output and is characterized by the operative pairing of the first plurality of solid state members with the second plurality of solid state members.

The present invention further includes a method for converting thermal energy to mechanical energy in a solid state heat engine comprising the steps of continuously coupling thermal energy into a first solid state member from a heat source to obtain a first type of mechanical response therefrom. The first type of mechanical response from the first solid state member is continuously coupled to a first driver pulley to exert a first type of torque thereon. Thermal energy from the first solid state member is continuously coupled into a heat sink to obtain a second type of mechanical response therefrom. The second type of mechanical response from the first solid state member is continuously coupled to a first driven pulley to exert a second type of torque thereof. The thermal energy from a second solid state heat member is continuously coupled into the heat sink to obtain a second type of mechanical response therefrom. The second type of mechanical response from the second solid state member is continuously coupled to a second driven pulley to obtain the second type of torque. The first driver pulley and second driven pulley are coupled so that the torque applied to the second driven pulley exceeds the torque applied to the first driver pulley. Thermal energy from the heat sink is continuously coupled to the second solid state member to obtain the first type of mechanical response therefrom. The first type of mechanical response from the second solid state member is continuously coupled to a second driver pulley to exert the first type of torque thereon. A second driver pulley is coupled to the first driven pulley so that the torque applied to the first driven pulley exceeds the torque applied to the second driver pulley. By this combination a compact compound solid state heat engine may be devised with increased power.

In another embodiment of the method at least one of the first and second types of mechanical responses of the solid state members is limited by a snubber which is a substantially flexible and inextensible member coupled at a plurality of points by crimping the solid state member by a volume displacement in excess of 12 percent.

The method also includes the embodiment wherein at least one of the driven or driver pulleys is a variable radius pulley having a radius varying in time in each angular direction with respect to a frame of reference rotating at the same angular velocity as the pulley and further having a radius constant in time in each angular direction with respect to a fixed non-rotating frame of reference. A constant radius differs in magnitude in each of the angular directions with respect to the fixed, non-rotating frame of reference.

These and other embodiments and advantages of the present invention can be better understood by viewing the following FIGURES in light of the Detailed Description of the Preferred Embodiments.

BRIEF DESCRIPTION OF THE DRAWINGS

FIG. 8 is yet another embodiment of a variable radius pulley; and

DETAILED DESCRIPTION OF THE PREFERRED EMBODIMENTS

The present invention includes a Nitinol solid state thermodynamic heat engine wherein two Nitinol elements are paired through pulley drives to provide a working engine in a compact form. A solid state heat engine may be further be improved by incorporating a flexible and substantially inextensible snubber which limits the strain to which the solid state element is subjected. In addition, any one or all of the pulleys involved in the solid state heat engine may be a variable radius pulley, which as described below, increases the mechanical conversion between the torque applied or exerted by the pulley and the solid state element or medium.

The present invention is based upon a solid state working medium which exhibits a joule effect response. In other words, a solid state medium exhibits a nonlinear relation between stress and strain which is reversible through temperature cycling, typically with a hysteresis effect. The basic physical characteristic of the solid state media is that it has a preferred or memorized shape. When the solid state material is cooled and deformed, usually stretched, it may be subsequently heated to return to its preferred or memorized shape. The force generated by the solid state element in returning to its preferred or memorized shape at the higher temperature is considerably greater than the force required to deform the material at the lower temperature. Thus, by cycling the material between a temperature differential in combination with compression and extension of the solid state member, useful work may be extracted from the temperature sources via the solid state medium. The particular practical advantage of a solid state engine of this type is the extraction of useful work from low-grade temperature sources which do not provide practical or economical energy sources for conventional thermodynamic engines.

The solid state material of the present invention is a shape-memory material of titanium nickel alloy having approximately 53.5 to 56.5 percent nickel content by weight and is commonly known as Nitinol. Nitinol is well known to the art, however, it may be expressly understood that any other equivalent material exhibiting the joule effect may be substituted such as alloys of copper and zinc, aluminum or tin, indium and thallium, gold and cadmium, iron and platinum, and various ternary alloys or higher order alloys such as alloys of copper, aluminum and nickel.

Figure 1:
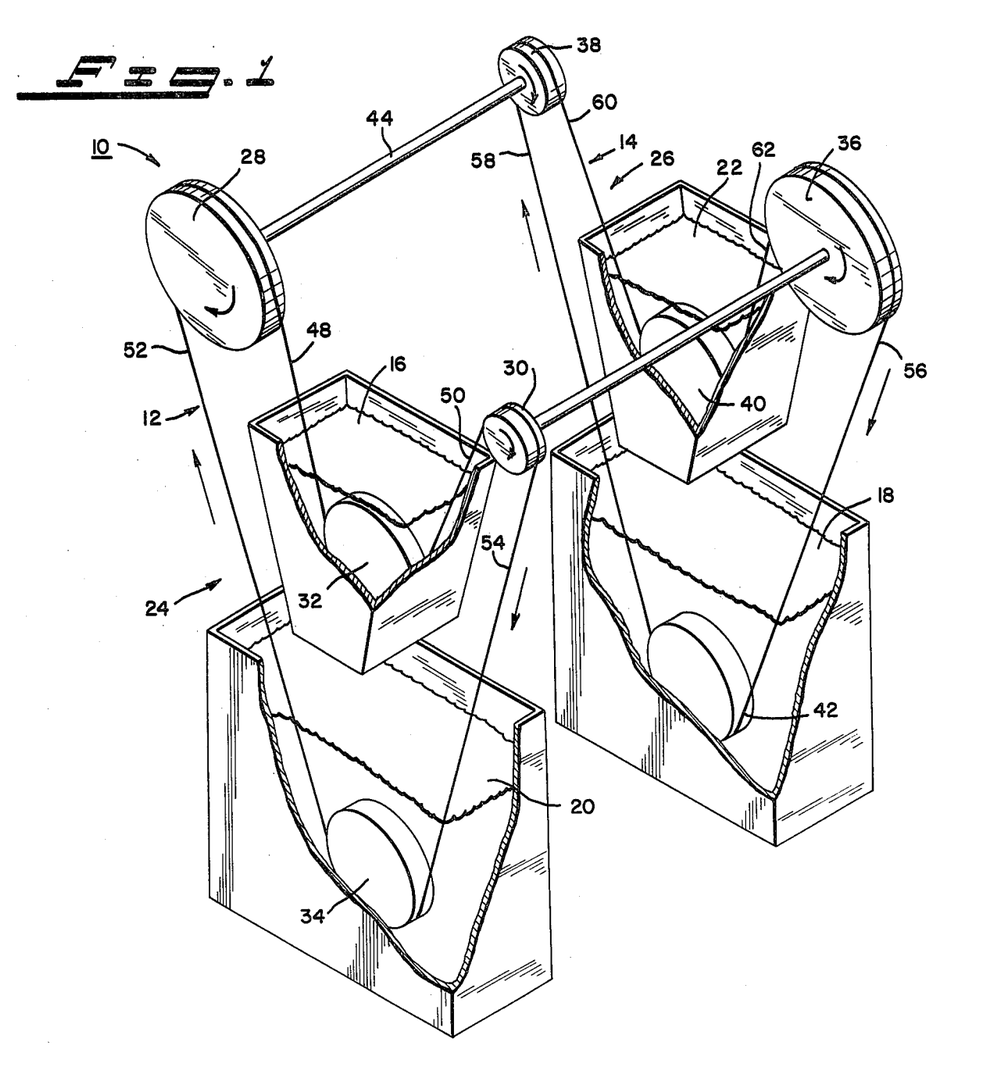
FIG. 1 is a simplified diagrammatic view of a single pair of solid state elements arranged in a compound engine of the present invention.

The principles of the present invention can best be understood by viewing FIG. 1 wherein a simplified diagrammatic perspective of one embodiment of the invention is illustrated. The thermodynamic heat engine 10 is shown as comprising two paired solid state elements 12 and 14. Each solid state element serves as an energy transferring medium between a heat source and heat sink. The heat source of FIG. 1 includes a hot water bath 16 and 18 while the heat sink includes a cold water bath 20 and 22.

Engine 10 of FIG. 1 may be conceptualize as comprising a first solid state engine 24 including solid state element 12, heat source 16 and heat sink 20 and a second solid state engine 26 including solid state element 14, heat source 18 and heat sink 22. First solid state engine 24 also includes a first driven pulley 28 and a first driver pulley 30. Idler pulleys 32 and 34 are provided to thermally couple solid state element 12 to heat source 16 and heat sink 20 respectively.

Similarly, second solid state heat engine 26 includes a second driven pulley 36 and a second driver pulley 38. Idler pulleys 40 and 42 cause solid state element 14 to thermally couple to heat sink 22 and heat source 18 respectively.

First solid state engine 24 and second solid state 26 operate in a cooperative manner to form a single working unit. Engine 24 is coupled to engine 26 by means of mechanical coupling between pulleys 28 and 38 and between pulleys 30 and 36. In the simplified embodiment of FIG. 1, these pulleys are rigidly and mechanically coupled by means of a drive shaft 44 between pulleys 28 and 38 and a drive shaft 46 between pulleys 30 and 36.

The operation of a compound engine of the type shown in FIG. 1 can now be understood. When the solid state element comes in contact with a heat source it contracts, and similarly when in contact with a heat sink it expands. Thus, that portion of element 12 in thermal contact with hot water bath 16 contracts and tends to provide a downward tension on portions 48 and 50 of element 12 on each side of pulleys 28 and 30 respectively. On the other hand, that portion of element 12 which is in thermal contact with cold water bath 20 tends to expand thereby lessening the degree of tension on portions 52 and 54 below pulleys 28 and 30 respectively. Consequently, there is a net torque applied to each pulley. In the case of driven pulley 28 the torque is clockwise as viewed in FIG. 1 whereas in the case of driver pulley 30 the force is counter-clockwise.

On the other hand, bath 22 and 18 of the second solid state heat engine 26 is reversed as compared to first solid state heat engine 24. For example, that portion of solid state element 14 in contact with hot water bath 18 is being contracted to exert a downward tensile force on portions 56 and 58 with respect to pulleys 36 and 38 respectively. Cold water bath 22 allows element 14 to expand thereby decreasing the amount of tensile force directed downward from pulleys 38 and 36 at portions 60 and 62 respectively. Therefore, as viewed in FIG. 1 a clockwise torque is exerted upon driven pulley 36 and a counter-clockwise torque is exerted upon driver pulley 38.

It should be noted that the direction or sense of torque exerted upon driver pulley 30 is opposite to that exerted upon driven pulley 36 by their respective solid state elements. Similarly, the torques exerted upon driver pulley 38 and driven pulley 28 are similarly opposed. However, the diameter of driven pulleys 36 and 28 is substantially larger than the diameter of driver pulleys 30 and 38. Therefore, inasmuch as the magnitude of the tensile force from solid state elements 12 and 14 is substantially equal at each corresponding portion of the element, the difference of the forces applied to the perimeter of each pulley is substantially equal. A larger torque will be applied to the driven pulleys 28 and 36 than the driver pulleys 30 and 38 since the diameter of the driven pulleys is greater than the diameters of the driver pulleys. Therefore, inasmuch driver pulley 30 and driven pulley 36 are mechanically and rigidly coupled, they will both rotate in a clockwise direction. In the same manner, driven pulley 28 and driver pulley 38 will rotate in a clockwise manner. Solid state elements 12 and 14 will therefore move across the plurality of pulleys as illustrated in FIG. 1 in a clockwise sense indicated by the arrows in a continuous thermodynamic cycle by which the energy of heat source 16 and 18 are transferred to heat sink 20 and 22. Solid state element 12 will be stretched as it emerges from cold water bath 20 and contracted as it emerges and travels through hot water bath 16. Element 12 will undergo similar contraction and expansion cycles with respect to baths 18 and 22.

Figure 2:
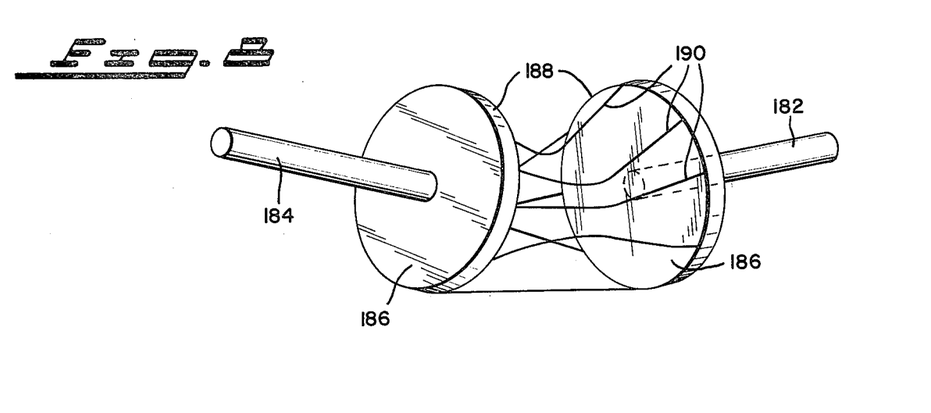
FIG. 2 is a partial view of one bank of a plurality of compound engines organized according to the present invention.
Figures 2, 3:
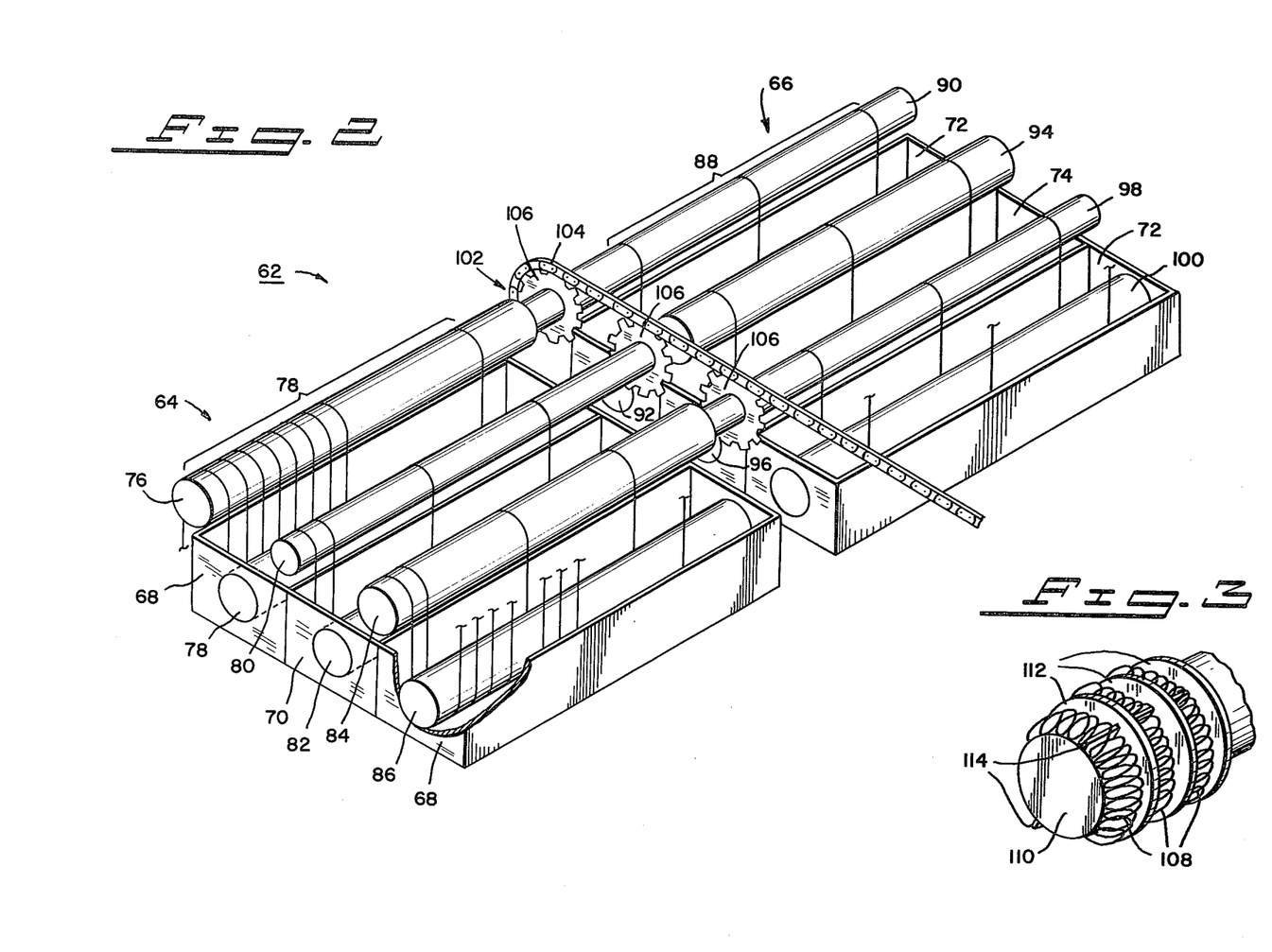
FIG. 3 is a detailed view of one embodiment of the engagement of the solid state medium with the rollers of FIG. 2.
Figure 4:
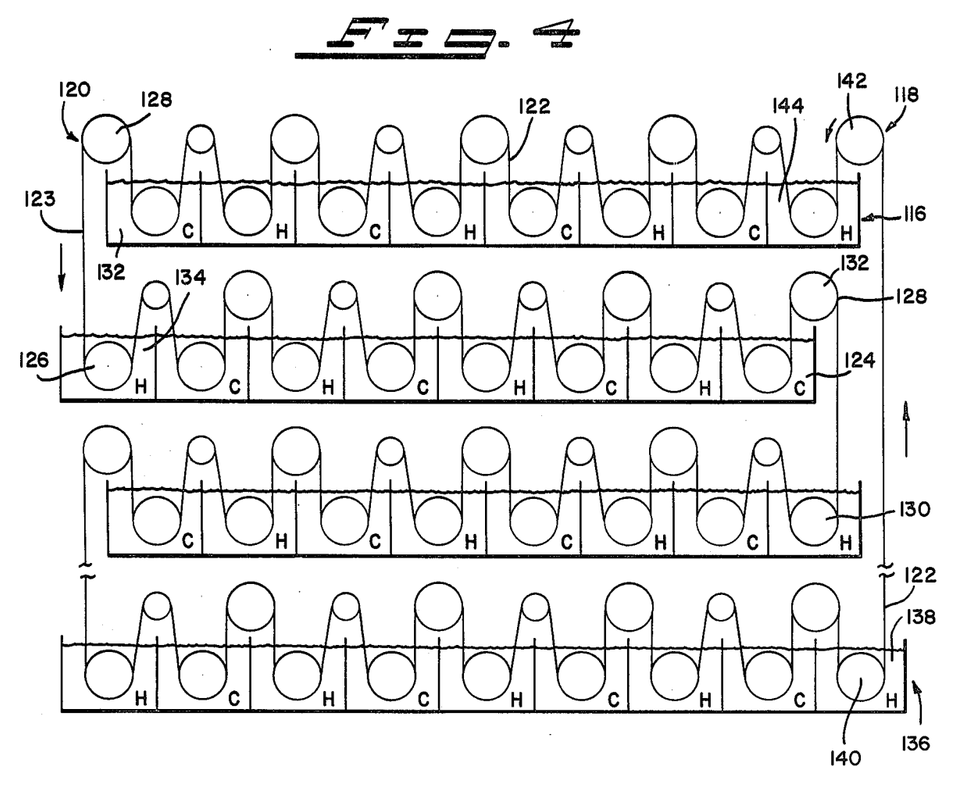
FIG. 4 is a simplified schematic side view of a plurality of banks of the type of compound engine as shown in FIG. 2.

The heat engine of FIG. 1 can be combined to form a practical compound engine as illustrated in FIGS. 2 through 4. FIG. 2 illustrates a compound solid state engine according to the present invention wherein a plurality of pairs of solid state elements, such as illustrated in FIG. 1 have been combined in a multiple array. Compound engine 62 is comprised of a first half 64 and second half 66. In each half 64 and 66 there is a plurality of alternating heat sources and sinks. In the simplified illustration of FIG. 2 the first half 64 includes hot water troughs 68 and cold water trough 70. Similarly, second half 66 includes cold water troughs 72 and hot water trough 74. In both halves 64 and 66 the heat sources and sinks are alternated and correspond to an opposing type heat source or sink in the opposite half. For example, cold water trough 70 of half 64 corresponds to hot water trough 74 of half 66 while cold water troughs 72 of half 66 correspond to hot water troughs 68 of half 64. Although the illustration of FIG. 2 shows only three alternated heat sources and sinks in each half it is to be understood, as is more clearly shown in FIG. 4, that the number of troughs can be extended.

Each half 64 or 66 has associated therewith a plurality of idler rollers, driver rollers and driven rollers which function in a similar manner to the idler, driven pulley and driver pulley of FIG. 1. Consider for example, half 64 of compound engine 62. A driven pulley 76 has a plurality of Nitinol bands or solid state elements 78 in contact therewith and lead by idler roller 78 to heat source 68. The plurality of bands is then coupled to a driver roller 80 disposed above and offset from roller 78. The alternation between idler rollers and a driven and driver roller continues through half 64 as illustrated in FIG. 2. For example, idler roller 82 follows driver roller 80 which is turn is followed by driven roller 84 and then idler roller 86. Correspondingly, half 66 of compound engine 62 includes a like plurality of idler, driven and driver rollers which are coupled to and guide an identical plurality of Nitinol bands or solid state elements 88 through the sources 74 and sinks 72 of half 66. For example, driver roller 90 is followed by an idler roller 92 (not shown) which is turn is followed by driven roller 94. Similarly, driven roller 94 is followed by idler roller 96 (not shown), driver roller 98 and idler roller 100.

It should be noted that each driven roller of half 64 corresponds to a driver roller of half 66 and visa versa in the same functional relationship as shown in FIG. 1. For example, driven roller 76 is rigidly and mechanically coupled to driver roller 90 while driven roller 94 is rigidly and mechanically coupled to driver roller 80. Useful work is extracted from compound engine 62 by means of a chain power takeoff 102 which is comprised of a conventional sprocketed chain 104 and a plurality of toothed wheels 106. Each wheel 106 is coupled to the associated driven and driver rollers of half 64 and 66. In the illustrated embodiment of FIG. 2 sprocketed wheel 106 is welded, splined or otherwise fixed to the extended portion of the driver roller which couples the driven and driver rollers. Plurality of solid state elements 78 and 88 are returned to the initial starting point by idler rollers, not shown, in FIG. 2 but described and shown in greater detail in FIG. 4.

The advantage of having each solid state element lying in a substantially singular plane as described and shown in FIG. 1 becomes apparent in a compound engine as shown in FIG. 2. Each solid state element of plurality 78 is matched to it corresponding elment of the plurality 88. Inasmuch as each element lies within a single plane, a substantial number of elements can be included in compound engine 62 to substantially increase the power output, efficiency and performance of the engine.

FIG. 3 shows a detailed view of three solid state elements 108 mechanically coupled to a roller 110. Roller 110 is representative of either a driven or driver roller. Each element 108 is separated from the adjacent element by a spacing washer 112. A plurality of webs 114 are circumferentially disposed on roller 110 between spacing washers 112. In the embodiment of FIG. 3 four webs 114 are symmetrically placed on each section of roller 110. Solid state elements 108 are shown as formed in the shape of a helix whereby the amount of solid state material per unit length of the element can be substantially increased thereby multiplying the physical response to the temperature changes to which the helical element is subjected. In addition, webs 114 couple or enmesh the individual spirals of helical element 108 to provide a secure and substantially nonslip mechanical coupling between elements 108 and roller 110.

Compound engine 62 is in one embodiment comprised of a plurality of stacked banks of the type illustrated in FIG. 2, each bank having a first and second half. FIG. 4 diagramatically illustrates a side view of such a stacked array of banks. A first or upper bank 116 has an initial starting position 118. The plurality of solid state elements traverse first bank 116 from right to left in the direction shown by arrows to emerge at an exit point 120. A plurality of elements 122 are then led downwardly to second bank 124 into the opposing type thermal bath by means of an idler roller 126 whose axis is approximately in line with the axis of driven roller 128. A plurality of elements 122 then traverse bank 124 in a similar manner to exit at point 128. From point 128 elements 122 are lead to an idler roller 130, which again has its axis substantially parallel and in line to the axis of driven roller 132. In a like manner, a plurality of element 122 are lead through an alternating series of hot and cold water baths in each of the plurality of banks. The heat sources and heat sinks of each bath are alternated with respect to the last bath of the adjacent upper or lower bank. For example, bath 133 of bank 116 is a heat sink. Therefore, bath 134 of bank 124 is a heat source. In the embodiment illustrated in FIG. 4 each bank contains an alternating series in each half of eight baths. In the lower most bank 136 an alternating series of nine baths are provided. In the last or ninth bath 138 a plurality of elements 122 are lead upward to the initial starting position 118. Idler roller 140 has its axis substantially parallel and in a line with the axis of driven roller 142. Baths 138 and 144 are the same type, in the embodiment of FIG. 4 are heat sources, and are the only exception to the serially ordered array of alternating baths. Although the embodiment of FIG. 4 shows only four banks the array could easily be extended to a substantially larger number. With the four banks illustrated in FIG. 4 each strand of the plurality of solid state elements 122 traverses 16 complete cycles on one traverse through the banks. Compound engine 62 can develop a useful level of power output in a compact array by employing the arrangement of FIG. 4. For example, the array of FIG. 4 could be extended to eight banks, thereby providing 32 cycles per strand in the volume of a cube 42 centimeters on a side.

Figure 5:
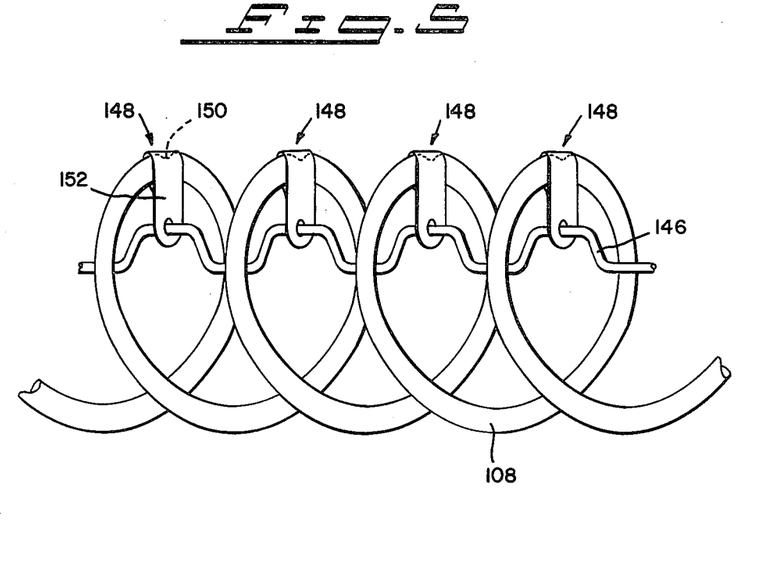
FIG. 5 is a simplified perspective view of a snubber according to the present invention coupled to a helical solid state element.

The compound heat engines of FIGS. 1, 2 or 4 can be improved by incorporating a snubber as illustrated in FIG. 5. FIG. 5 shows in simplified form a portion of a helical solid state element 108 of the type illustrated in FIG. 3. In the embodiment wherein solid state element 108 is comprised of Nitinol, the elastic strain limit of element 108 is low and can be easily exceeded. The term, "elastic strain limit" is meant to define that amount of strain beyond which recovery is not possible, and is not taken to mean merely the limit of linear, reversible strain. For example, if during a stretching cycle such as occurs at portions 54 and 52 of FIG. 1, the magnitude of force exerted upon element 108 exceeds the elastic limit, the solid state element will fail to return to its initial preferred shape. As a result, the degree of force which can be usefully extracted from element 108 substantially decreases and ultimately the engine will fail to function. In view of the extreme tendency of Nitinol to suffer rapid and extensive irreversible strain, once the elastic limit is exceeded, a snubber 146 which is a flexible but substantially inextensible member, can be employed to limit the strain suffered by element 108 to below the critical elastic limit. Any conventional material which has the characteristics of flexibility and substantial inextensibility may be employed as snubber 146. For example, nylon or dacron string or a small gauge chain or wire can be usefully adapted for this purpose.

However, inasmuch as Nitinol is extremely soft and has the general consistency of putty, the attachment of snubber 146 to element 108 present substantial problems. According to the present invention snubber 146 is attached at a plurality of points 148 of element 108 by means of crimping. As shown in FIG. 5 a dimple 150 is formed at each point 148 by crimping a tab 152 to element 108 at point 148. Typically, tab 152 is a metallic tab capable of assuming a permanently deformed, crimped configuration corresponding to dimple 150. Snubber 146 is then attached to tab 152 by any conventional means, such as knotting, gluing, welding, soldering, crimping, or the like.

However, Nitinol suffers substantial changes of shape and volume as it is thermally cycled. Typically, Nitinol will undergo as much as 12 percent volume changes between the maximum and minimum temperatures. In order to prevent dimple 150 from essentially disappearing and losing attachment with tab 152, it is therefore necessary to displace the volume of Nitinol element at points 148 during the formation of dimple 150 to a degree in excess of the maximum volume changes which the element will undergo. For example, it has been observed that volume displacements of approximately 15 percent are sufficient to allow tab 152 to remain in secure attachment to element 108 at the plurality of points 148. The maximum size of dimple 150 is, however, limited by the need to retain the structural integrity of element 108. Clearly, an excessively large dimple 150 would substantially weaken element 108 at each of the points of attachment 148. Thus, a volume displacement in excess of 12 percent at points 148 has been found acceptable, the maximum limitation being a matter of design choice according to the above principles. More precisely, changes in one or more elements of the strain sensor in excess of 12% or of approximately 15% has been found acceptable.

The conversion from the physical change of the solid state element to useful mechanical energy is accomplished in a turbine type engine of the present invention by virtue of the coupling of the solid state element with a pulley. In the embodiment of FIG. 1 it was assumed that the pulleys in each instance were constant radius pulleys. The work conversion, however, may be improved by the employment of a variable radius pulley such as described below. In the case of a constant radius pulley the contact between the solid state element and the pulley can be classified as either having nonsliding contact or sliding contact. In the case where the element does not slip or slide along a pulley, the entire change of length of the element occurs entirely before or after the element is in contact with the pulley. The expansion or contraction occurs adiabatically and consequently the transfer of work between the solid state element and pulley is substantially decreased below the theoretical maximum as a result of the free expansion of at least a portion of the solid state element. In some configurations of a turbine type engine, such as illustrated in FIG. 1, free expansion may cause that portion of thermodynamic cycle in which heat is added to the solid state element to be performed at a constant force thereby reducing the efficiency and the net work/mass output ratio by a factor of four or more.

In the case where the solid state element slides over the pulley, a degree of control is lost in the thermodynamic cycle at that point where useful work is converted by the pulley from the solid state element. In addition, frictional sliding dissipates energy which otherwise could be usefully employed.

In a variable radius pulley wherein a solid state element has no appreciable tangential sliding movement, the radius of the pulley is progressively changed as the element is carried along the pulley's surface. The change of length of a unit of the element as it traverses the pulley is chosen by design to be approximately equal to the amount of thermodynamically induced change of length in order to maximize possible work exchange between the solid state element and the pulley.

Figures 6, 7, 9:
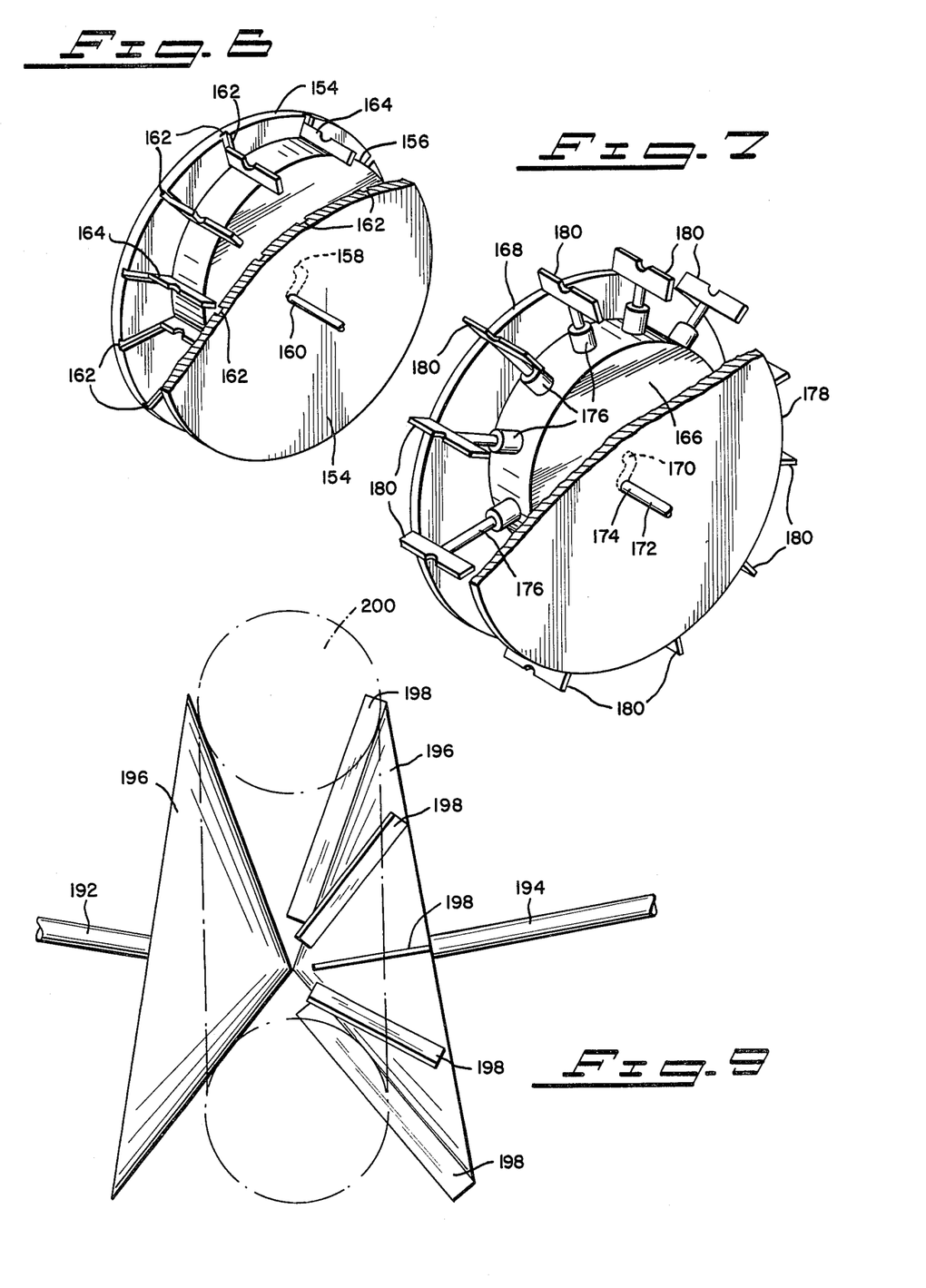
FIG. 6 is a simplified broken view of a variable radius pulley according to one embodiment of the present invention.
FIG. 7 is another embodiment of a variable radius pulley shown in simplified form.
FIG. 9 is stil yet another embodiment of a variable radius pulley according to the present invention.

One embodiment of the variable radius pulley is illustrated in FIG. 6. The pulley is comprised of a driver or working pulley 154 and an idler pulley 156. Idler pulley 156 has an axis of rotation 158 which is parallel to and offset from axis of rotation 160 of pulley 154. The idler pulley 156 is disposed inside the two halves of pulley 154 as illustrated in the embodiment of FIG. 6 and rotates freely therebetween. Each half of pulley 154 includes a plurality of grooves 162 which are inscribed into the interior surface of each half of pulley 154. A web member 164 is slidely disposed in each groove 162 and has sufficient clearance to freely move in a radial direction. A retaining ring, not shown, or an equivalent means may be provided for retaining web members in grooves 162 during a complete revolution of pulley 154. The solid state element then couples or is engaged to web members 164 as the solid state member traverses the pulley. An offset crank may be provided as the axial member for axis 158 and 160. The offset crank is not shown in FIG. 6 but is clearly illustrated in another embodiment in FIG. 7. It may readily be understood that as a solid state member travels across the variable radius pulley of FIG. 6, the distance of the member from axis 160 will change as web member 164 moves in sliding contact with idler pulley 156.

Another embodiment of the offset crank, variable radius pulley is illustrated in FIG. 7. The embodiment of FIG. 7 is the inverse of the embodiment of FIG. 6. In the embodiment of FIG. 7 the driver or working pulley 166 is disposed within an idler pulley 168. Again, axis 170 of pulley 166 is parallel to and offset from axis 172 of idler pulley 168 by means of an offset crank 174. Equally spaced above the periphery of working pulley 166 is a plurality of rods or pistons 176 which are freely movable in the radial direction. Pistons 176 may assume a cylinder and piston combination as shown in FIG. 7 or may be rods which freely slip-fit into holes drilled within pulley 166 or any other equivalent means well known to the art. Idler pulley 168 is comprised of two halves within which pulley 166 is disposed. The peripheral portions 178 of idler pulley 168 are in sliding contact with the bottom of web members 180. A web member 180 is fixed to each of pistons 176 coupled to pulley 166. The solid state member mechanically engages or couples web members 180 which then describe a variable radius as the solid state member traverses the pulley of FIG. 7.

FIG. 8 shows yet another embodiment of the variable radius pulley of the present invention which is an angled axis type. Shown in simplified form, the embodiment of FIG. 8 comprises a first and second axes 182 and 184 respectively which when extended define intersecting lines. Each axis is coupled to a disc or pulley member 186. The peripheral portions 188 of discs 186 define a generally circular periphery to which a plurality of flexible and substantially inextensible strings or guides are attached. Inasmuch as axis 182 and 184 are inclined to each other, the geodesic or straight line distance between two corresponding opposing points on periphery 188 of disc 186 changes as the disc rotates. This is reflected by a bending or flexing of strings 190. The length of the strings is chosen such that the midpoint of the string is always radially displaced from the intersection of axes 182 and 184 extended. The solid state member lies across the flexed strings and thus is variably displaced from the intersection of axes 182 and 184 extended as the variable radius pulley of FIG. 8 rotates.

Still another embodiment of an angled axis variable radius pulley is illustrated in FIG. 9. Again, the pulley includes two angled axes 192 and 194. Each axis is coupled to a conically shaped member 196. Although member 196 is illustrated in FIG. 9 as a perpendicular conic section many other equivalent shapes are well known to the art such as sections of elipsoids, spheres and any geometric body having a generally positive curvature. The face of at least one of members 196 is provided with a plurality of symmetrically disposed web members 198. Webs 198 provide a coupling or engagement between solid state element 200 and the angled axis variable radius pulley. As is graphically shown in FIG. 9, the effective radius experienced by solid state element 200 as it traverses the pulley varies from a minimum at the lower portion to a maximum at the upper portion. The angle of axes 194 and 192 and the slope of members 196 are determined according to design choice according to the above disclosed principles.

Although the present invention has been described and illustrated in terms of a specific embodiment it must be understood that many alterations and modifications may be made by one having ordinary skill in the art without departing from the scope and spirit of the invention. Further, the illustrated embodiment is but one example of the present invention as it is set forth and claimed below. Although the present invention has assumed throughout a plurality of water baths, it is to be expressly understood that any type of heat source or sink may be employed including oil baths and other conventional energy sinks and sources not employing liquid media for heat exchange, such as radiant heaters and coolers.

I claim:

1. A compound solid state heat engine comprising:
   a source of thermal energy;
   a sink of thermal energy;
   a first solid state heat engine having a first energy transferring medium, a first driven means and a first driver means, said first driven and driver means for mechanically coupling with said first energy transferring medium and for translating force exerted by said first energy transferring medium into a force exerted by said first driven and first driver means, said first energy transferring means thermally being coupled to said source and sink respectively;
   a second solid state heat engine having a second energy transferring medium, a second driven means and a second driver means, said second driven and second driver means for mechanically coupling with said second energy transferring medium and for translating force exerted by said second energy transferring medium into a force exerted by said second driven and second driver means, said second energy transferring means being thermally coupled to said source and sink;
   coupling means for coupling said first driven means to said second driver means and for coupling said second driven means to said first driver means, whereby said first and second solid state heat engines are cooperatively paired to provide an increased power output; and
   wherein at least one of said first and second energy transferring means includes a snubbing means for limiting tensile stress applied to said energy transferring means.

2. A compound solid state heat engine comprising:
   a source of thermal energy;
   a sink for thermal energy;
   a first solid state heat engine having a first energy transferring medium, a first driven means and a first driver means, said first driven and driver means for mechanically coupling with said first energy transferring medium and for translating force exerted by said first energy transferring medium into a force exerted by said first driven and first driver means, said first energy transferring means thermally being coupled to said source and sink respectively;
   a second solid state heat engine having a second energy transferring medium, a second driven means and a second driving means, said second driven and second driver means for mechanically coupling with said second energy transferring medium and for translating force exerted by said second energy transferring medium into a force exerted by said second driven and second driver means, said second energy transferring means being thermally coupled to said source and sink;
   coupling means for coupling said first driven means to said second driver means and for coupling said second driven means to said first driver means, whereby said first and second solid state heat engines are cooperatively paired to provide an increased power output; and
   wherein at least one of said first and second driven and driver means includes a variable radius pulley having a temporally varying radius in each angular direction with respect to a frame of reference rotating at the same angular velocity as said variable radius pulley and having a temporally constant radius in each angular direction with respect to a fixed, nonrotating frame of reference, said constant radius differing in magnitude in each said angular direction with respect to said fixed, nonrotating frame of reference.

3. The compound heat engine of claim 2 wherein said variable radius pulley is comprised of a first and second rotatable member, each having a mutually parallel axis of rotation offset one from the other.

4. The compound heat engine of claim 3 wherein said first rotatable member is an idler pulley and said second rotatable member is a web carrying pulley for providing said mechanical coupling to at least one of said first and second energy transferring mediums.

5. The compound heat engine of claim 4 wherein said idler pulley is disposed inside said web carrying pulley, said web carrying pulley having a plurality of webs for contacting said at least one medium, and said plurality of webs being in slideable contact with said idler pulley.

6. The compound heat engine of claim 4 wherein said web carrying pulley is disposed inside said idler pulley, said web carrying pulley having a plurality of webs coupled thereto by a corresponding plurality of slideable pistons, said idler pulley being in slideable contact with said plurality of webs.

7. The compound heat engine of claim 2 wherein said variable radius pulley is an angled axis pulley having two rotating members, each rotating on an axis angled with respect to the other.

8. The compound heat engine of claim 7 wherein said angled axis pulley comprises;
   a first and second rotating member each having a peripheral portion, and each rigidly coupled to and rotating about a first and second axis respectively, each peripheral portion lying in a plane substantially perpendicular to said corresponding first and second axis; and
   a plurality of substantially inextensible and flexible members, each coupled between said peripheral portions of said first and second rotating members, said plurality of inextensible members for providing said mechanical coupling.

9. The compound heat engine of claim 7 wherein said angled axis pulley comprises:
   a first and second rotating member rigidly coupled to and rotating about a first and second axis respectively and each having a conically shaped surface disposed toward the other; and
   a plurality of web means for providing said mechanical coupling, said plurality of web means disposed on said conically shaped surface on at least one of said first and second rotating members.

10. In a solid state heat engine having a thermally responsive solid state shape memory alloy medium which is thermally cycled between a source and sink of thermal energy, an improvement comprising:
    a snubber, substantially inextensible, coupled to said solid state medium at a series of points and limiting the extensibility of said solid state member between consecutive points in said series, thereby limiting the mechanical stress on said solid state member during said thermal cycling.

11. The improvement of claim 10 wherein said snubber is coupled to said solid state medium by crimping said solid medium thereto.

12. The improvement of claim 11 wherein said snubber is crimped to said solid state medium by displacing said solid state medium in the vicinity of said crimping by a volume displacement in excess of 12 percent.

13. The improvement of claim 12 wherein said volume displacement is approximately 15 percent.

14. In a solid state heat engine having a thermally responsive solid state medium which is thermally cycled between a source and sink of thermal energy to convert thermal energy to mechanical work therefrom, an improvement comprising:
a variable radius pulley, mechanically coupling to said solid state medium, said variable radius pulley having a magnitude of radius varying in time in each angular direction with respect to a frame of reference rotating at the same angular velocity as said variable radius pulley and having a magnitude of radius constant in time in each angular direction with respect to a fixed, nonrotating frame of reference, said temporally constant magnitude of radius varying in each angular direction with respect to said fixed, non-rotating frame of reference,
whereby the efficiency of conversion of thermal energy to mechanical work between said solid state medium and variable radius pulley is increased.

15. The improvement of claim 14 wherein said variable radius pulley is comprised of a first and second rotatable member, each having a mutually parallel axis of rotation off-set one from the other.

16. The improvement of claim 15 wherein said first rotatable member is an idler pulley and said second rotatable member is a web carrying pulley for providing said mechanical coupling to said solid state medium.

17. The improvement of claim 16 wherein said idler pulley is disposed inside said web carrying pulley, said web carrying pulley having a plurality of webs slidingly coupled thereto, said plurality of webs for contacting said solid state medium, and said plurality of webs being in slideable contact with said idler pulley.

18. The improvement of claim 16 wherein said web carrying pulley is disposed inside said idler pulley, said web carrying pulley having a plurality of webs coupled thereto by a corresponding plurality of slideable pistons, said idler pulley being in slideable contact with said plurality of webs.

19. The improvement of claim 14 wherein said variable radius pulley is an angled axis pulley having two rotating members, each rotating on an axis angled with respect to the other.

20. The improvement of claim 19 wherein said angled axis pulley comprises:
a first and second rotating member, each having a peripheral portion and each rigidly coupled to and rotating about a first and second axis respectively, each peripheral portion lying in a plane substantially perpendicular to said corresponding first and second axis; and
a plurality of substantially inextensible and flexible members, each coupled between said peripheral portions of said first and second rotating members, said plurality of inextensible members for providing mechanical coupling between said variable radius pulley and said solid state medium.

21. The improvement of claim 15 wherein said angles axis pulley comprises:
a first and second rotating member rigidly coupled to and rotating about a first and second axis respectively and each having a conically shaped surface disposed toward the other; and
a plurality of web means for providing said mechanical coupling, said plurality of web means disposed on said conically shaped surface on at least one of said first and second rotating members.

22. A compound solid state heat engine comprising:
a plurality of heat sources and sinks arranged in a first and second symmetric half, a heat source in said first half being juxtaposed next to a heat sink in said second half;
a heat sink in said first half being juxtaposed to a heat source in said second half, said heat sources and sinks being alternately disposed within each said first and second halves;
a plurality of idler rollers, one of said plurality of idler rollers being disposed in each one of said plurality of heat sources and sinks;
a plurality of driven rollers and drivers rollers, each driven roller of said plurality associated with one of said first and second halves and coupled to a driver roller of said plurality associated with said other one of said first and second halves, each said driven roller in one of said halves separated an essentially fixed distance from the driver roller associated into the same said half; and
a first and second plurality of thermally responsive solid state shape memory alloy members exhibiting a joule effect contraction upon heating, said members coupled to said plurality of idler, driven and driver rollers, said first plurality being coupled to said rollers associated with said first half, and said second plurality being coupled to said rollers associated with said second half, said first and second plurality of solid state members being urged by said plurality of idler rollers into thermal contact with said plurality of heat sources and sinks;
wherein said first plurality of solid state members is operatively paired with said second plurality of solid state members;
wherein said first and second plurality of solid state members includes a snubber coupled thereto for limiting the strain of said solid state members;
whereby a compact solid state engine is devised having an increased power output.

23. The engine of claim 22 wherein said snubber is a substantially flexible and inextensible means coupled to a plurality of points on each said solid state member by crimping.

24. The engine of claim 23 wherein said crimping includes a volume displacement of a portion of each crimped point of said solid state member in excess of 12 percent.

25. A method for converting thermal energy to mechanical energy in a solid state engine comprising the steps of:
continuously coupling thermal energy into a first solid state shape memory alloy member from a heat source to obtain a first type of mechanical response therefrom, said first type of mechanical response including a joule effect contraction;
continuously coupling said first type of mechanical response from said first solid state member to a first driver pulley to exert a first type of torque thereon;

continuously coupling thermal energy from said first solid state member into a heat sink to obtain a second type of mechanical response therefrom, said second type of mechanical response including a joule effect expansion;

continuously coupling said second type of mechanical response from said first solid state member to a first driven pulley a fixed distance from said first driver pulley to exert a second type of torque thereon;

continuously coupling thermal energy into said heat sink from a second solid state shape memory alloy member to obtain said second type of mechanical response therefrom;

continuously coupling said second type of mechanical response from said second solid state member to a second driven pulley a fixed distance from a second driver pulley to obtain said second type of torque, said first driver pulley and said second driven pulley being coupled, said torque applied to said second driven pulley exceeding said torque applied to said first driver pulley;

continuously coupling thermal energy from said heat source to said second solid state member to obtain said first type of mechanical response therefrom;

continuously coupling said first type of mechanical response from said second solid state member to said second driver pulley to exert said first type of torque thereon, said second driver pulley being coupled to said first driven pulley, said torque applied to said first driven pulley exceeding said torque applied to said second driver pulley;

wherein at least one of said first and second types of mechanical responses is limited by a snubber;

whereby a compact compound solid state engine may be devised with increased power.

26. The method of claim 25 wherein said snubber comprises a substantially flexible inextensible member coupled at a plurality of points to at least one of said first and second solid state members by crimping said at least one solid state member at said plurality of points by a volume displacement in excess of 12 percent.

27. A method for converting thermal energy to mechanical energy in a solid state engine comprising the steps of:

continuously coupling thermal energy into a first solid state shape memory alloy member from a heat source to obtain a first type of mechanical response therefrom, said first type of mechanical response including a joule effect contraction;

continuously coupling said first type of mechanical response from said first solid state member to a first driver pulley to exert a first type of torque thereon;

continuously coupling thermal energy from said first solid state member into a heat sink to obtain a second type of mechanical response therefrom, said second type of mechanical response including a joule effect expansion;

continuously coupling said second type of mechanical response from said first solid state member to a first driven pulley a fixed distance from said first driver pulley to exert a second type of torque thereon;

continuously coupling thermal energy into said heat sink from a second solid state shape memory alloy member to obtain said second type of mechanical response therefrom;

continuously coupling said second type of mechanical response from said second solid state member to a second driven pulley a fixed distance from a second driver pulley to obtain said second type of torque, said first driver pulley and said second driven pulley being coupled, said torque applied to said second driven pulley exceeding said torque applied to said first driver pulley;

continuously coupling thermal energy from said heat source to said second solid state member to obtain said first type of mechanical response therefrom; and continuously coupling said first type of mechanical response from said second solid state member to said second driver pulley to exert said first type of torque thereon, said second driver pulley being coupled to said first driven pulley, said torque applied to said first driven pulley exceeding said torque applied to said second driver pulley;

wherein at least one of said first and second driven and driver pulleys is a variable radius pulley having a radius varying time in each angular directions with respect to a frame of reference rotating at the same angular velocity as said at least one pulley and having a radius constant in time in each angular direction with respect to a fixed, nonrotating frame of reference, said constant radius differing in magnitude in each said angular direction with respect to said fixed, nonrotating frame of reference;

whereby a compact compound solid state engine may be devised with increased power.

28. A compound solid state heat engine comprising:

A plurality of continuous loops of shape memory alloy material which undergoes a joule effect contraction upon heating to an elevated liquid water temperature;

banks of alternating hot and cold water baths at temperatures providing joule effect contraction of said alloy material at the hot bath temperature and lower energy stretchability of said alloy material at the cold bath temperature;

an array of driving, driven and idler rollers on parallel axes leading said loops of alloy material in parallel planes sequentially through cold water baths, stretching the alloy material at the lower temperature at the driven rollers, and then leading said loops into the hot water baths and taking energy from the contraction of said alloy material at the hot bath temperature at the driving rollers, whereby each loop of said alloy material is subjected to multiple cycles of stretching and contraction in each traverse through said banks;

and means coupling the driving and driven rollers whereby the energy for stretching the said alloy material at the lower temperature is provided from the driving rollers.

29. A compound solid state heat engine according to claim 28 wherein the stretching of the said alloy material at the lower temperature is limited in each cycle by a substantially flexible and inextensible snubber.

30. A compound solid state heat engine according to claim 28 wherein the said alloy material is nitinol.

31. A compound solid state heat engine according to claim 28 wherein the said driving, driven and idler rollers are on fixed axes establishing fixed lengths of the runs of the said alloy material between rollers, and the diameters of the driven rollers being greater than the diameters of the driving rollers to provide controlled stretching of the alloy material by the driven rollers at the cold bath temperature and to provide delivery of rotational force in excess of the stretching force to the driving rollers at the hot bath temperature.

32. A compound solid state heat engine comprising: a first half and a second half each of said halves having:

(a) a plurality of continuous loops of shape memory alloy material which undergoes a joule effect contraction upon heating to an elevated liquid water temperature;
(b) a plurality of sources of thermal energy at a temperature sufficiently elevated to produce the joule effect contraction of said shape memory alloy material;
(c) a plurality of sinks for thermal energy at a sufficiently lower temperature than said sources of thermal energy to permit stretching of said shape memory alloy material by a force substantially less than the force of the joule effect contraction of said material at the temperature of said sources of thermal energy;
(d) said sources and sinks of thermal energy being arrayed alternately along the paths of said loops of shape memory alloy material and the sources and sinks for said first and second halves of the engine being arrayed whereby each source of thermal energy in the first half is positioned opposite a sink in the second half;
(e) first means in each of said halves for continuously moving said loops of shape memory alloy material in heat exchange with said sinks for thermal energy and stretching said material at the lower temperature;
(f) second means in each of said halves for continuously moving said loops of shape memory alloy material in heat exchange with said sources of thermal energy and converting the force of the contractions of said material at the elevated temperature to rotational force;
(g) and rigid coupling means drivingly connecting the first and second halves of the engine whereby rotational force developed by the contractions of said alloy material in one half is transmitted to the means for stretching the alloy material in the other half.

* * * * *